(12) United States Patent
Ando

(10) Patent No.: US 7,016,179 B2
(45) Date of Patent: Mar. 21, 2006

(54) SOLID ELECTROLYTIC CAPACITOR

(75) Inventor: Hideki Ando, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/001,799

(22) Filed: Dec. 1, 2004

(65) Prior Publication Data
US 2005/0117280 A1 Jun. 2, 2005

(30) Foreign Application Priority Data
Dec. 1, 2003 (JP) .............................. 2003-401993

(51) Int. Cl.
H01G 9/00 (2006.01)
(52) U.S. Cl. ...................... 361/523; 361/525; 361/528; 361/529; 361/532; 29/25.03
(58) Field of Classification Search ................ 361/523, 361/525–528, 528–530, 531–533; 29/25.03
See application file for complete search history.

(56) References Cited
U.S. PATENT DOCUMENTS

| | | | |
|---|---|---|---|
| 5,629,830 A * | 5/1997 | Yamagami et al. ......... 361/535 |
| 6,343,004 B1 * | 1/2002 | Kuranuki et al. ........... 361/523 |
| 6,392,869 B1 * | 5/2002 | Shiraishi et al. ............ 361/523 |
| 6,625,009 B1 * | 9/2003 | Maeda ....................... 361/528 |
| 6,751,086 B1 | 6/2004 | Matsumoto | |
| 6,891,717 B1 * | 5/2005 | Fujii et al. .................. 361/523 |
| 2004/0066608 A1 * | 4/2004 | Takagi et al. ............... 361/530 |

FOREIGN PATENT DOCUMENTS

JP    2003-68576    3/2003

* cited by examiner

Primary Examiner—Nguyen T. Ha
(74) Attorney, Agent, or Firm—Hamre, Schumann, Mueller & Larson, P.C.

(57) ABSTRACT

A solid electrolytic capacitor includes a capacitor element assembly, an anode lead and a cathode lead. The assembly includes a plurality of capacitor elements each consisting of a sintered valve metal chip, an anode wire projecting from the chip, a solid electrolytic layer formed on the chip, and a cathode layer formed on the electrolytic layer. The chip of each capacitor element is flat, having a thickness smaller than its length and width. The capacitor elements are stacked in a thickness direction of the chip so that the cathode layers of the respective capacitor elements are connected to each other. The anode wires are fixed to the anode lead. At least one of the cathode layers is directly connected to the cathode lead.

4 Claims, 3 Drawing Sheets

SOLID ELECTROLYTIC CAPACITOR

BACKGROUND OF THE INVENTION

1. Field of the Invention

The present invention relates to a solid electrolytic capacitor utilizing the so-called valve metal such as tantalum or niobium. In particular, the present invention relates to a solid electrolytic capacitor provided with a pair of leads to enable mounting onto a printed circuit board, for example.

2. Description of the Related Art

Typically, a solid electrolytic capacitor of the above-mentioned type comprises a capacitor element which includes a sintered porous chip and an anode wire projecting from an end surface of the chip. Such a porous chip is made of powdered valve metal such as tantalum or niobium, which is compacted into a rectangular solid or a circular column. The particles of the metal powder are covered by a highly insulating dielectric layer. The outer surface of the chip is formed with a solid electrolytic layer upon which a cathode layer is formed. The above-mentioned anode wire is connected to an anode lead, while the cathode layer on the chip is connected to a cathode lead. In use, the anode and cathode leads are soldered to e.g. a printed circuit board (see JP-A-2003-68576, for example).

In the above-described capacitor element, the solid electrolytic layer formed on the chip has a large contact area coming into contact with the dielectric layer, which is advantageous for providing a large capacitance per unit volume of the capacitor element. On the other hand, the solid electrolytic layer has an outer surface area (noncontact surface area) which does not come into contact with the dielectric layer. This noncontact surface area of the electrolytic layer is generally equal to the outer surface area of the sintered chip, but much smaller than the above-mentioned contact area contacting with the dielectric layer. Accordingly, the solid electrolytic layer has a considerably large equivalent series resistance (ESR).

As conventionally known, generally the equivalent series resistance is inversely proportional to the above-mentioned noncontact surface area of the electrolytic layer. Therefore, the noncontact surface area should be increased for decreasing the equivalent series resistance, thereby improving the capacitor performance in a high frequency range.

However, as previously noted, the porous chip of the capacitor element is a rectangular solid (having a rectangular cross section) or a circular column (having a circular cross section), and the noncontact surface area of the solid electrolytic layer is generally equal to the outer surface area of the chip. Therefore, to increase the noncontact surface area, the outer surface area of the chip needs to be increased, in other words, the external size of the chip needs to be increased. Under these circumstances, the conventional solid electrolytic capacitor tends to be unfavorably large in size and weight in order to improve the capacitor performance in a high frequency range.

SUMMARY OF THE INVENTION

The present invention has been proposed under the above-described circumstances to overcome the conventional problems.

According to the present invention, there is provided a solid electrolytic capacitor comprising: a capacitor element assembly provided with an anode and a cathode; an anode lead for the anode of the assembly; and a cathode lead for the cathode of the assembly. The capacitor element assembly comprises a plurality of capacitor elements, each of the capacitor elements including a sintered chip of valve metal powder, an anode wire projecting from the chip, a solid electrolytic layer formed on the chip as a lining, and a cathode layer formed on the solid electrolytic layer. The chip of each capacitor element is formed into a flat shape having a thickness, a length and a width, the thickness being smaller than the length and the width. The plurality of capacitor elements are stacked in a thickness direction of the chip so that the cathode layers of the respective capacitor elements are connected to each other. The anode wires of the respective capacitor elements are fixed to the anode lead. At least one of the cathode layers of the respective capacitor elements is connected to the cathode lead.

With such an arrangement, compared to the conventional capacitor element (a single capacitor element having a rectangular or circuit cross section), it is possible to increase the "noncontact surface area" of the solid electrolytic layer (i.e. the surface area of the part which does not contact with the dielectric layer covering the valve metal particles) in the presence of the part of the solid electrolytic layer that is disposed between the adjacent capacitor elements.

Further, according to the above arrangement, the chip of each capacitor element is made flat by making its thickness smaller than its length and width, and also a plurality of capacitor elements are stacked in the thickness direction of the chips, with their cathode layers connected to each other. As a result, even if the noncontact surface area of the solid electrolytic layers increases, the capacitor element assembly itself does not become unacceptably large. In other words, the increase rate of the size of the assembly is considerably small compared to the increase rate of the noncontact surface area of the solid electrolytic layers.

Therefore, according to the above arrangement, it is possible to make advantageously small the equivalent series resistance (ESR) between the anode lead and the cathode lead without suffering unacceptable size increase of the solid electrolytic capacitor.

Preferably, all the cathode layers of the respective capacitor elements may be connected to the cathode lead.

With such an arrangement, the equivalent series resistance (ESR) between the anode lead and the cathode lead is more effectively reduced.

Preferably, the anode wires of the respective capacitor elements may be aligned in line extending in a stacking direction of the capacitor elements, and further the anode lead may include an upright portion formed with positioning grooves into which the anode wires are snugly fitted.

With such an arrangement, the capacitor element assembly can be properly positioned relative to the anode and cathode leads. Also, each of the capacitor elements can be reliably connected to the anode lead.

Preferably, the anode lead may include an upright portion formed with stairs-like steps. Further, the anode wires of the respective capacitor elements may be offset from each other correspondingly to the steps.

With such an arrangement again, the capacitor element assembly can be properly positioned relative to the anode and cathode leads by using the stairs-like steps as a positioning guide for the anode wires of the respective capacitor elements.

Preferably, the capacitor element assembly may be oriented so that the stacking direction of the capacitor elements is parallel to an upper surface of the cathode lead. In this case, all the cathode layers of the respective capacitor elements may be fixed to the cathode lead via electroconductive paste.

With such an arrangement, all the cathode layers can be easily fixed to the cathode lead by using the electroconductive paste. As noted above, the connection between all the cathode layers and the cathode lead results in reduction of the equivalent series resistance (ESR).

DETAILED DESCRIPTION OF THE PREFERRED EMBODIMENTS

Preferred embodiments of the present invention will now be described below with reference to the accompanying drawings.

Figure 1:
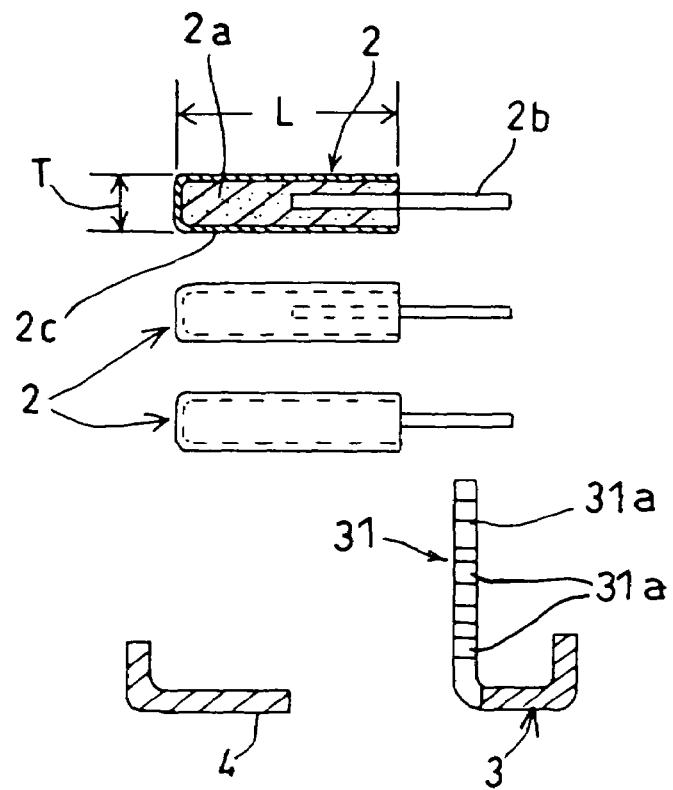
FIG. 1 is an exploded view showing a solid electrolytic capacitor according to a first embodiment of the present invention.
Figure 2:
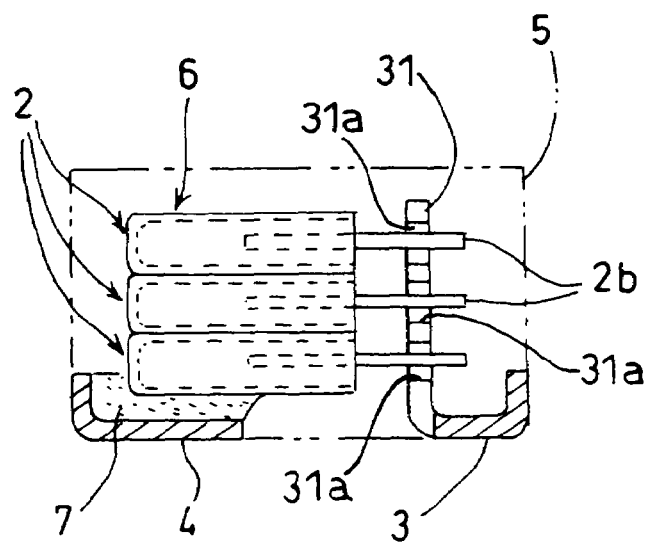
FIG. 2 is a sectional front view showing the capacitor of the first embodiment.
Figure 3:
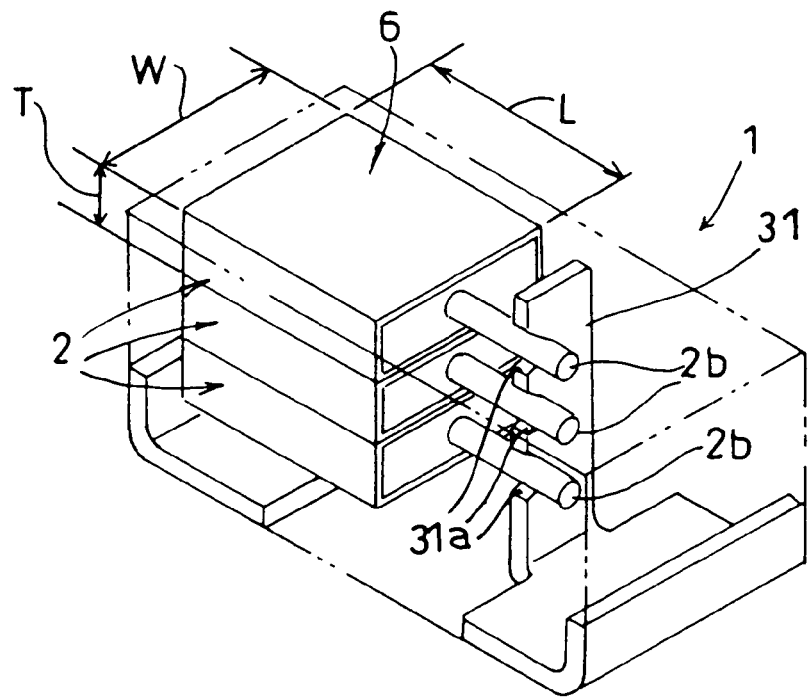
FIG. 3 is a perspective view showing the capacitor of the first embodiment, with the package removed.

Reference is first made to FIGS. 1–3 illustrating a solid electrolytic capacitor 1 according to a first embodiment of the present invention.

The solid electrolytic capacitor 1 includes a plurality of capacitor elements 2 (three elements shown in the figures), a pair of metal leads (right and left) 3 and 4, and a synthetic resin package 5 to entirely enclose the respective capacitor elements 2.

Each of the capacitor elements 2 includes a sintered chip 2a made of powdered valve metal and an anode wire 2b projecting from an end surface ("anode end surface") of the chip 2a. The chip 2a is produced by compacting valve metal powder into a flat rectangular solid and then sintering this solid. The resultant chip 2a has prescribed thickness T, length L and width W (see FIG. 3), where the thickness T is smaller than the length L and the width W. Though not shown in the figures, the metal particles forming the chip 2a are covered by a dielectric layer, and upon this dielectric layer are formed a solid electrolytic layer (except on the "anode end surface" of the chip 2a) and further a cathode layer 2c held in contact with the electrolytic layer.

Then, a predetermined number of capacitor elements 2 thus obtained are stacked in the thickness direction of the chip 2a in a manner such that their cathode layers 2c are electrically connected (or connected, for short) to each other. As a result, a laminated assembly 6 consisting of the capacitor elements 2 is obtained.

As shown in FIG. 2, the capacitor element assembly 6 is placed on the left lead 4, with electroconductive paste 7 intervening between the assembly 6 and the lead 4. Meanwhile, the anode wires 2b of the respective capacitor elements 2 are brought into contact with an upright portion 31 of the right lead 3. In the illustrated example, the capacitor elements 2 are vertically stacked and the three anode wires 2b contact with the upright portion 31 at different heights.

As seen from FIG. 3, the anode wires 2b of the capacitor elements 2, protruding in the same horizontal direction, are aligned in the element-stacking direction, i.e. in the vertical direction. Correspondingly, the upright portion 31 of the anode lead 3 is formed with positioning grooves 31a on the side of one vertical edge of the portion 31 for receiving the anode wires 2b, respectively. Each anode wire 2b, fitted snugly into the corresponding one of the grooves 31a, is welded to the upright portion 31.

With the above arrangement, the capacitor element assembly 6 can be accurately positioned relative to the leads 3 and 4 by fitting the anode wires 2b into the relevant grooves 31a of the upright portion 31. In this manner, for instance, it is easy to place the assembly 6 at the center of the leads 3 and 4 in the width direction of the leads.

Further, since each anode wire 2b is snugly fitted into the groove 31a, the wire 2b does not undergo positional deviation when it is welded to the anode lead 3. Accordingly, reliable electrical connection is established between the capacitor elements 2 and the anode lead 3.

Regarding the lowermost capacitor element 2 among the three capacitor elements of the assembly 6, the cathode layer 2c formed on the chip 2a is connected to an upper surface of the cathode lead 4 via the electroconductive paste 7. Hence, the cathode layers 2c formed on the middle and uppermost chips 2a are also connected to the cathode lead 4.

The package 5 for entirely enclosing the capacitor element assembly 6 is produced by transfer molding using a synthetic resin. For this process, care should be taken so that the two leads 3, 4 are embedded by the resultant package 5, while at least lower surfaces of the respective leads 3, 4 are exposed to the outside in the bottom surface of the package 5.

According to the present embodiment, a plurality of capacitor elements 2 are stacked so that their cathode layers 2c are connected to each other for producing a single capacitor element assembly 6. With such an arrangement, compared to the conventional capacitor element, it is possible to increase the "noncontact surface area" of the solid electrolytic layer (i.e. the surface area of the part which does not contact with the dielectric layer covering the valve metal particles) in the presence of the part of the solid electrolytic layer that is disposed between the adjacent capacitor elements 2, 2.

Further, according to the present embodiment, the chip 2a of each capacitor element 2 is made flat by making the thickness T smaller than the length L and the width W, and also a plurality of capacitor elements 2 are stacked in the thickness direction of the chips 2a, with their cathode layers 2c connected to each other. With such an arrangement, even if the noncontact surface area of the solid electrolytic layers increases, the capacitor element assembly 6 itself does not become unacceptably large. In other words, the increase rate of the size of the assembly 6 is considerably small compared to the increase rate of the noncontact surface area of the solid electrolytic layers.

Therefore, according to the present embodiment, it is possible to make advantageously small the equivalent series resistance (ESR) between the anode lead 3 and the cathode lead 4 without suffering unacceptable size increase of the solid electrolytic capacitor 1.

Figure 4:
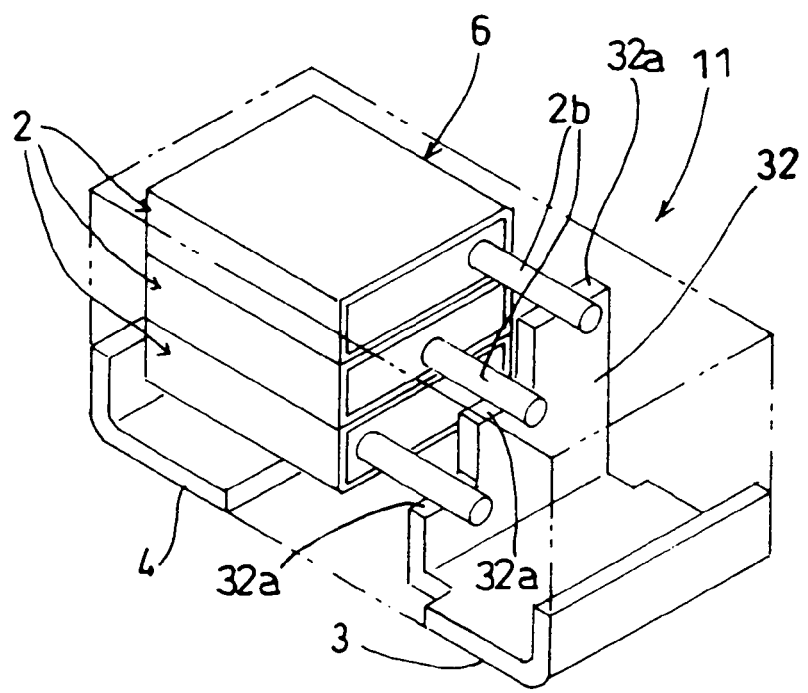
FIG. 4 is a perspective view showing a solid electrolytic capacitor according to a second embodiment of the present invention, with the package removed.

Reference is now made to FIG. 4 illustrating a solid electrolytic capacitor 11 according to a second embodiment of the present invention. The solid electrolytic capacitor 11 of the second embodiment is basically similar to the capacitor 1 of the first embodiment except for the following features.

Specifically, as shown in FIG. 4, the anode lead 3 includes a stairs-like upright portion 32 formed with a plurality of steps 32a (three steps in the illustrated example). Corresponding to these steps 32a, the anode wires 2b of the respective capacitor elements 2 are offset horizontally from each other, so that one anode wire 2b comes into contact with one relevant step 32a. Each anode wire 2b is fixed to the corresponding step 32a by welding, for example.

With such an arrangement, the capacitor element assembly 6 can be accurately placed relative to the leads 3, 4 by using the stairs-like upright portion 32 as a positioning guide for the anode wires 2b and hence the capacitor elements 2. Thus, like the first embodiment, the capacitor element assembly 6 can be easily positioned at the center of the leads 3, 4 in the width direction of the leads.

Figure 5:
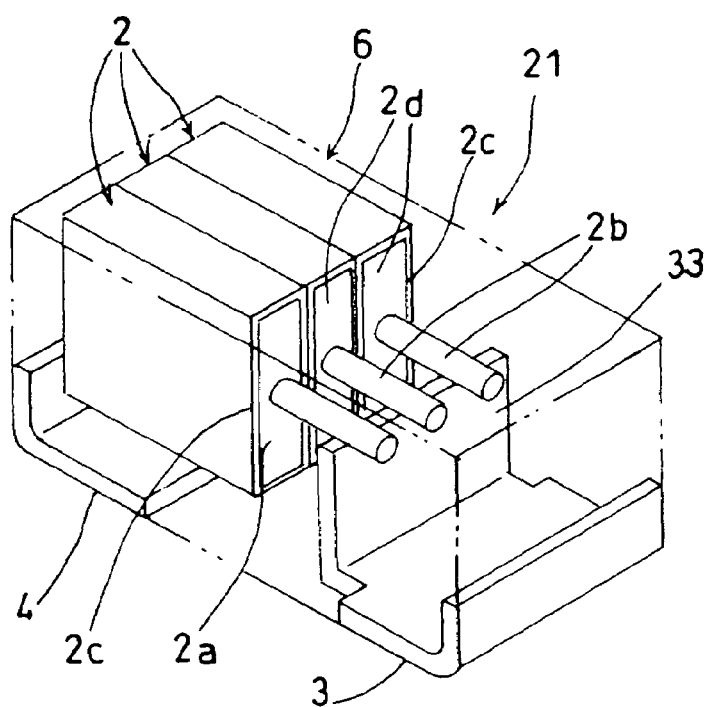
FIG. 5 is a perspective view showing a solid electrolytic capacitor according to a third embodiment of the present invention, with the package removed.

FIG. 5 shows a solid electrolytic capacitor 21 according to a third embodiment of the present invention.

In this embodiment, for providing a capacitor element assembly 6, three adjacent capacitor elements 2 are arranged laterally (side by side) so that the stacking direction of the capacitor elements 2 is parallel to an upper supporting surface of the cathode lead 4. As seen from FIG. 5, the anode wires 2b of the respective capacitor elements 2 are at the same height and spaced laterally from each other. The anode wires 2b are welded to the flat upper end surface of an upright portion 33 of the anode lead 3. In the third embodiment, all the cathode layers 2c of the capacitor elements 2 are directly connected to the cathode lead 4 via electroconductive paste (not shown). The other features of the capacitor 21 are similar to those of the capacitor 1 of the first embodiment.

According to the third embodiment, all the cathode layers 2c of the capacitor element assembly 6 are held in direct contact with the cathode lead 4. Thus, the equivalent series resistance (ESR) between the anode lead 3 and the cathode lead 4 can be much smaller than by the first embodiment. In this connection, it should be noted that the reduction of ESR is performed simply, that is, only by connecting the cathode layers 2c to the cathode lead 4 with the use of electroconductive paste.

As variations of the third embodiment shown in FIG. 5, the upright portion 33 may be formed with positioning grooves arranged for enabling snug fitting of the anode wires 2b (as in the first embodiment) or formed with steps of different heights (as in the second embodiment).

The invention claimed is:

1. A solid electrolytic capacitor comprising:
a capacitor clement assembly provided with an anode end a cathode;
an anode lead for the anode of the assembly; and
a cathode lead for the cathode of the assembly;
wherein the capacitor element assembly comprises a plurality of capacitor elements, each of the capacitor elements including a sintered chip of valve metal powder, an anode wire projecting from the chip, a solid electrolytic layer formed on the chip as a lining, and a cathode layer formed on the solid electrolytic layer,
the chip of each capacitor element being formed into a flat shape having a thickness, a length and a width, the thickness being smaller than the length and the width, the plurality of capacitor elements being stacked in a thickness direction of the chip so that the cathode layers of the respective capacitor elements are connected to each other,
the anode wires of the respective capacitor elements being fixed to the anode lead,
at least one of the cathode layers of the respective capacitor elements being connected to the cathode lead;
wherein the anode wires of the respective capacitor elements are aligned in line extending in a stacking direction of the capacitor elements, the anode lead including an unright portion formed with positioning grooves into which the anode wires are snugly fitted.

2. The solid electrolytic capacitor according to claim 1, wherein all the cathode layers of the respective capacitor elements are connected to the cathode lead.

3. A solid electrolytic capacitor comprising:
a capacitor element assembly provided with an anode and a cathode;
an anode lead for the anode of the assembly; and
a cathode lead for the cathode of the assembly;
wherein the capacitor element assembly comprises a plurality of capacitor elements, each of the capacitor elements including a sintered chip of valve metal powder, an anode wire projecting from the chip, a solid electrolytic layer formed on the chip as a lining, and a cathode layer formed on the solid electrolytic layer,
the chip of each capacitor element being formed into a flat shape having a thickness, a length and a width, the thickness being smaller than the length and the width, the plurality of capacitor elements being stacked in a thickness direction of the chip so that the cathode layers of the respective capacitor elements are connected to each other,
the anode wires of the respective capacitor elements being fixed to the anode lead, at least one of the cathode layers of the respective capacitor elements being connected to the cathode lead;
wherein the anode lead includes an upright portion formed with stairs-like steps, the anode wires of the respective capacitor elements being offset from each other correspondingly to the steps.

4. The solid electrolytic capacitor according to claim 3, wherein all the cathode layers of the respective capacitor elements are connected to the cathode lead.

* * * * *